United States Patent [19]

McPherson

[11] Patent Number: 4,619,288
[45] Date of Patent: Oct. 28, 1986

[54] ADJUSTABLE TRANSDUCER AND LOCK MECHANISM FOR MONITORING VALVE POSITION

[75] Inventor: Robert R. McPherson, Kalamazoo, Mich.

[73] Assignee: Pneumo Corporation, Boston, Mass.

[21] Appl. No.: 795,337

[22] Filed: Nov. 6, 1985

[51] Int. Cl.$^4$ ............................................. F16K 37/00
[52] U.S. Cl. ................................... 137/554; 137/556; 336/136; 340/870.33
[58] Field of Search ................ 137/554, 556; 336/136; 340/870.33

[56] References Cited

U.S. PATENT DOCUMENTS

| | | | |
|---|---|---|---|
| 2,120,048 | 6/1938 | Turner | 336/136 |
| 3,349,840 | 10/1967 | Tope et al. | 137/554 |
| 3,367,365 | 2/1968 | Stevens | 137/554 |
| 3,486,774 | 11/1974 | Thornbard et al. | 137/554 |
| 3,492,616 | 1/1970 | Singleton et al. | 336/136 |

Primary Examiner—A. Michael Chambers
Attorney, Agent, or Firm—Renner, Otto, Boisselle & Lyon

[57] ABSTRACT

A lost-motion connection is provided between the armature core of a valve position sensor and the valve plunger preventing relative rotation therebetween while permitting relative axial movement by rotation of an adjuster sleeve having threaded engagement with extensions on both the armature core and valve plunger. Surrounding the adjuster sleeve is a locking collar having a multi-sided internal surface engaging a correspondingly shaped multi-sided exterior surface on the adjuster sleeve, whereby rotation of the locking collar causes rotation of the adjuster sleeve. The locking collar is also axially movable into and out of engagement with another correspondingly shaped multi-sided exterior surface on the valve plunger to respectively prevent and permit rotation of the locking collar relative to the valve plunger. The adjuster sleeve may have internal threads of opposite hand at opposite ends thereof in threaded engagement with the extensions on the armature core and valve plunger to provide a coarse adjustment of the armature core relative to the valve plunger during each revolution of the adjuster sleeve. Alternatively, such internal threads may be of the same hand and of different pitch to provide for fine adjustment during each revolution of the adjuster sleeve.

19 Claims, 4 Drawing Figures

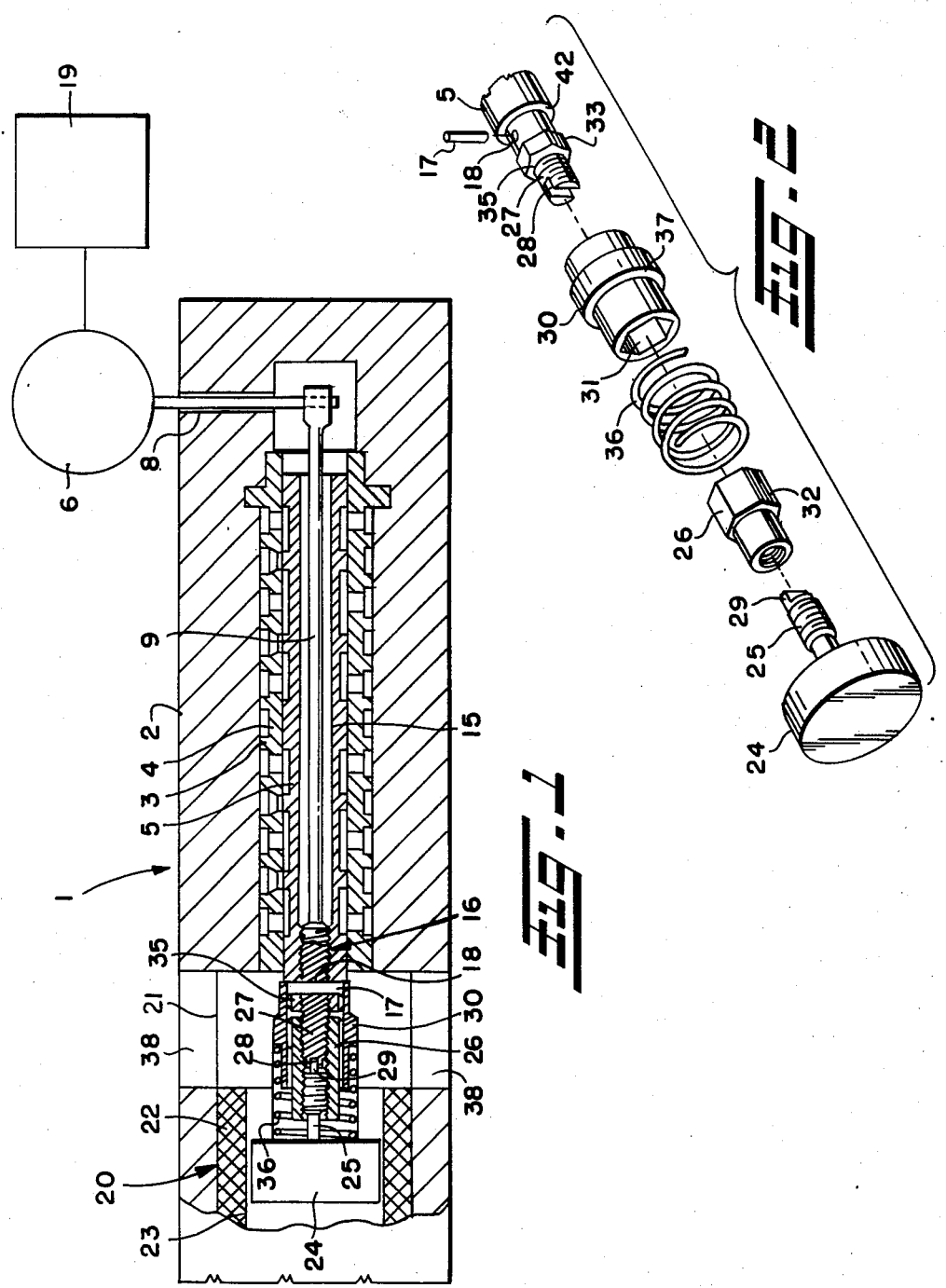

ADJUSTABLE TRANSDUCER AND LOCK MECHANISM FOR MONITORING VALVE POSITION

BACKGROUND OF THE INVENTION

This invention relates generally as indicated to an adjustable transducer and lock mechanism for monitoring the position of a valve and particularly the valve plunger.

Certain types of fluid servo systems used in flight controls for aircraft and other applications utilize transducers or sensors for monitoring the position of various movable parts such as the valve plunger of a servovalve to provide feed-back information which is used to control the valve movements. In such systems, it would be desirable to provide a relatively simple and easy way of adjusting the position of the transducer relative to the valve plunger so that the setting of the transducer can be made to correspond to a known position of the valve plunger and then locking the transducer in the desired adjusted position.

SUMMARY OF THE INVENTION

With the foregoing in mind, it is a principal object of this invention to provide novel means for adjusting the setting of a transducer relative to a valve plunger and for locking the transducer in the desired adjusted position.

Another object is to provide for either coarse or fine adjustment of the transducer.

Still another object is to provide for precise incremental adjustment of the transducer.

These and other objects of the present invention may be achieved by providing a lost-motion connection between the movable armature core of the transducer and the valve plunger preventing relative rotation therebetween while permitting relative axial movement by rotation of an adjuster sleeve having threaded engagement with extensions on both the armature core and valve plunger. The adjuster sleeve may be locked against rotation by a locking collar having a multi-sided internal surface when brought into simultaneous engagement with correspondingly shaped exterior surfaces on the adjuster sleeve and valve plunger extension.

To adjust the position of the armature relative to the valve plunger, the locking collar is retracted to disengage the locking collar from the valve plunger extension so that the locking collar can be rotated to correspondingly rotate the adjuster sleeve, thus causing axial movement of the armature connected thereto.

The differential motion of the armature is a function of the thread pitches and the form of the mating locking surfaces on the locking collar, adjuster sleeve and valve plunger. Coarse adjustment may be obtained by providing internal threads of opposite hand and of the same or different pitch in the opposite ends of the adjuster sleeve, whereas fine adjustment may be obtained by providing threads of the same hand but of a different pitch. Also, the number of sides or points on the locking surfaces may be varied to provide the desired incremental adjustment to the armature. After the desired adjustment has been made, the locking collar is positioned so that it is in precise alignment with the locking surface on the valve plunger to permit the locking collar once again to be moved forward over the locking surface of the valve plunger to lock the transducer in the desired adjusted position.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through a preferred form of valve and transducer assembly in accordance with the present invention;

FIG. 2 is an exploded isometric view showing the various movable transducer parts and associated lock mechanism for releasably locking the armature core against axial movement relative to the valve plunger;

DETAILED DESCRIPTION OF THE PREFERRED EMBODIMENT

Figure 3:
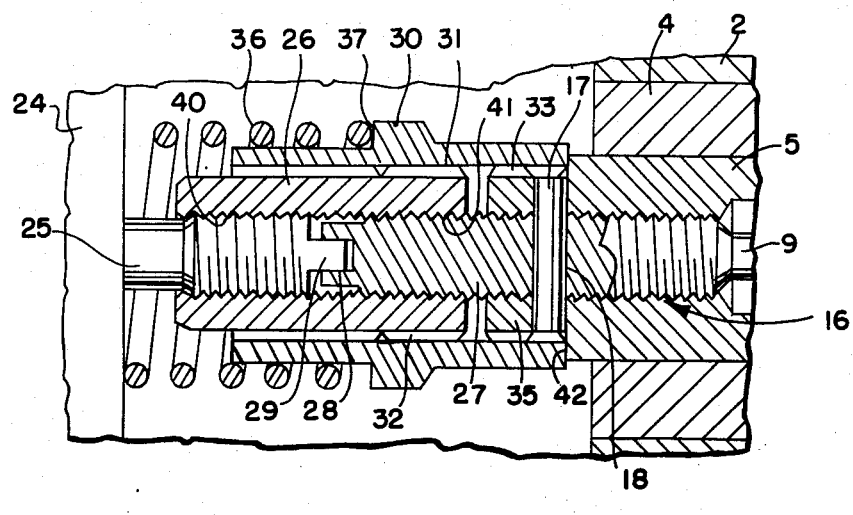
FIG. 3 is an enlarged fragmentary longitudinal section showing the transducer locked against adjustment.

Referring now in detail to the drawings, in FIG. 1 there is illustrated one type of servo valve 1 including a valve housing 2 containing a bore 3 for receipt of a valve sleeve 4. Axially movable within the valve sleeve is a valve plunger 5. Controlled selective movement of the valve plunger 5 may be effected by an electric force motor 6 schematically shown located closely adjacent one end of the servo valve. The force motor 6 may either be of the linear or rotary type including a motor shaft 8 operatively connected to the valve plunger 5 by a flexible drive shaft or quill 9 connected at its opposite ends to the valve plunger and motor shaft, respectively.

The valve plunger 5 being tubular includes an axial bore 15 through which the drive shaft 9 extends for connection to the end of the valve plunger furthest from the motor output shaft 8 as by means of a threaded connection 16 between the drive shaft 9 and valve plunger to permit adjustment of the neutral or null position of the valve plunger relative to the null position of the force motor prior to inserting a pin 17 through a transverse hole 18 in the drive shaft adjacent the end of the valve plunger, to prevent relative rotation therebetween. If desired, the drive shaft and/or pin may be brazed to the valve plunger following such adjustment.

The force motor may be responsive to command signals received from an electronic control or command system 19 which may be located, for example, in the cockpit of an aircraft, whereby the force motor 6 serves as a control input to the valve plunger 5. Feed-back information to the command system 19 may be obtained by providing a position transducer or sensor 20 operatively connected to the valve to monitor the position of the valve plunger 5. In FIG. 1 the transducer 20 is shown contained within a counterbore 21 in the valve housing 2 adjacent the outer end of the valve plunger 5. However, as will be apparent, a separate housing may be provided for the transducer and suitably mounted to the valve housing.

The transducer 20 includes an electrical transformer coil 22 having an elongated core cavity 23 in which fits a movable armature core 24. The transformer is commonly referred to as a linear variable differential transformer and comprises multiple electrical coils through which the armature core 24 is moved with the position of the armature being detected by the electrical field sensed by the secondary coil or coils of the transformer. Varying the position of the armature core varies the magnetic coupling between the primary and secondary coils of the transformer, and by detection of the electrical signals generated in the secondary coils, the position of the armature may be determined.

Figure 4:
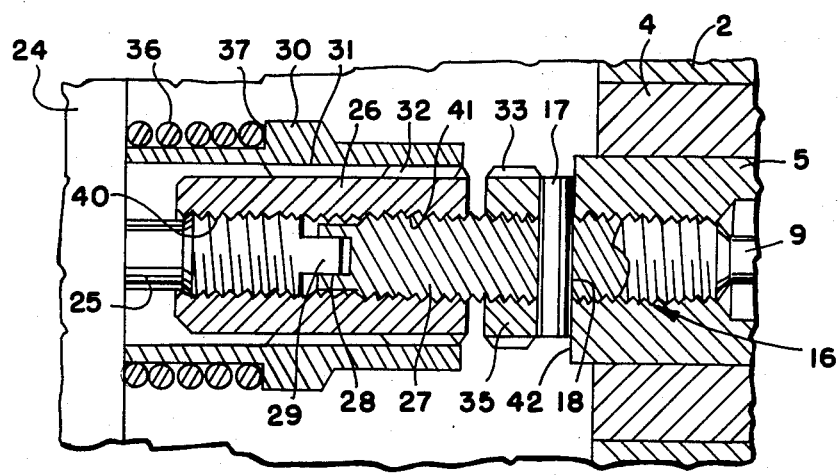
FIG. 4 is an enlarged fragmentary longitudinal section similar to FIG. 3 but showing the transducer in the unlocked condition permitting limited axial adjustment of the armature core relative to the valve plunger.

In the preferred form of the invention disclosed herein, the armature core 24 has a transducer arm 25 extending coaxially therefrom for connection to the adjacent end of the valve plunger 5 by means of an adjuster sleeve 26 having threaded engagement with the transducer arm 25 and an extension 27 of the drive shaft 9 which extends axially outwardly beyond the end of the valve sleeve 4 and valve plunger 5 and into the counterbore 21 in the valve housing (or transducer housing) 2. As best seen in FIGS. 2–4, the drive shaft extension 27 has a transverse slot 28 therein for receipt of a tongue or projection 29 on the inner end of the transducer arm 25 thus providing a lost-motion connection therebetween preventing rotation of the transducer arm relative to the valve plunger while permitting axial movement thereof during rotation of the adjuster sleeve 26 due to the differential motion generated by the internal threads on the adjuster sleeve and external threads on the transducer arm and drive shaft extension 27 as described hereafter.

Normally, the adjuster sleeve 26 is locked against rotation by a locking collar 30 which has a multi-sided opening 31 therethrough that simultaneously engages correspondingly shaped exterior surfaces 32, 33 on the adjuster sleeve 26 and valve plunger (drive shaft) extension 27 when the locking collar is in the extended position overlying the outer end of the valve plunger (drive shaft extension) as shown in FIGS. 1 and 3. The multi-sided surface 33 on the valve plunger 5 may comprise a nut 35 threaded onto the drive shaft extension 27 up against the pin 17. The locking collar 30 is normally retained in such extended position by a spring 36 interposed between the armature core 24 and an external shoulder 37 on the locking collar as shown.

To adjust the position of the armature core 24 relative to the valve plunger 5 to match the setting of the transducer to correspond to a known position of the valve plunger, the locking collar 30 is manually retracted from the valve plunger to the position shown in FIG. 4 to disengage the locking collar from the nut 35 so that the locking collar can be rotated to correspondingly rotate the adjuster sleeve 26 thus causing axial movement of the transducer arm 25 and armature core connected thereto relative to the valve plunger 5. Access to the locking collar 30 may be obtained through suitable openings 38 in the housing 2 as schematically shown in FIG. 1.

The differential motion of the transducer arm is a function of the pitches of the internal threads 40, 41 at each end of the adjuster sleeve 26 which respectively threadedly engage the transducer arm 25 and drive shaft extension 27. Additionally, coarse or fine adjustment may be obtained depending on whether threads 40, 41 of the opposite or same hand are selected at opposite ends of the adjuster sleeve.

That is, if threads 40, 41 of opposite hand and of different pitch are provided at opposite ends of the adjuster sleeve, the minimum adjustment for one revolution of the adjuster sleeve would be the sum of the reciprocals of the two pitches, which would provide a relatively coarse adjustment. As an example, a forty pitch right hand thread 40 at one end of the adjuster sleeve and a thirty-six pitch left hand thread 41 at the other end would produce a travel of approximately 0.0528 inch of the armature core 24 relative to the valve plunger 5 for each revolution of the adjuster sleeve. Also, the threads 40, 41 could be of the same pitch as long as they are of opposite hand.

For fine adjustment, the threads 40, 41 could be of the same hand but of different pitch. Then the least increment of adjustment for one full revolution of the adjuster sleeve would be the difference of the reciprocals of the two pitches or 0.0028 inch for a forty pitch thread 40 at one end and a thirty-six pitch thread 41 at the other end.

Also, the number of sides of points 31, 32, 33 on the mating locking surfaces of the locking collar 30, adjuster sleeve 26 and nut 25 may be varied to provide a desired incremental adjustment to the transducer. In the case of a hexagonal element, each incremental movement (i.e. one sixth of a revolution of the adjuster sleeve) would equal one sixth of the adjustment produced by a full revolution; in the case of a twelve point element, each incremental adjustment would produce one twelfth of such movement; etc.

After the desired adjustment has been made, the locking surface 31 on the locking collar 30 must be positioned so that it is in precise alignment with the locking surface 33 on the value plunger (nut) 35 to permit the locking collar once again to be moved forward over the outer end of the drive shaft extension 27 by the force of the spring 36 and up against a shoulder 42 at the end of the valve plunger 5 to lock the armature core 24 in the desired adjusted position relative to the valve plunger.

Although the invention has been shown in described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

What is claimed is:

1. In combination, a fluid valve and transducer mechanism for monitoring valve position, said valve including an axially movable valve plunger, and said transducer mechanism including an armature core connected to said valve plunger for movement therewith, adjusting means for adjusting the axial position of said armature core relative to said valve plunger, and locking means for releasably locking said armature core against relative axial movement, said adjusting means including means providing a lost-motion connection between said armature core and valve plunger permitting relative axial movement but preventing relative rotation therebetween, and sleeve means having different thread means in threaded engagement with threaded portions of said armature core and valve plunger, respectively, which, upon rotation of said sleeve means in opposite directions, will cause axial movement of said armature core toward and away from said valve plunger, and releasable lock means for preventing rotation of said sleeve means.

2. The combination of claim 1 wherein said releasable lock means comprises a locking collar surrounding said sleeve means,, said locking collar having a multi-sided internal surface engaging a correspondingly shaped multi-sided exterior surface on said sleeve means, whereby rotation of said locking collar causes rotation of said sleeve means, and another correspondingly shaped multi-sided exterior surface on said valve plunger also engageable by said multi-sided internal surface on said locking collar to prevent rotation of said locking collar, said locking collar being axially movable along said sleeve means into and out of engagement with said another multi-sided exterior surface on said valve plunger.

3. The combination of claim 2 wherein said valve plunger has a threaded extension on one end, and a nut threaded onto said threaded extension, the exterior surface of said nut constituting said another multi-sided exterior surface on said valve plunger.

4. The combination of claim 3 wherein said threaded extension defines said threaded portion on said valve plunger which is in threaded engagement with one of said thread means of said sleeve means.

5. The combination of claim 3 wherein said valve plunger is hollow, and a drive shaft extends through the center of said valve plunger and beyond said one end, the end of said drive shaft extending beyond said one end of said valve plunger being threaded to provide said threaded extension on said valve plunger.

6. The combination of claim 5 wherein said threaded end of said drive shaft is also in threaded engagement with said one end of said valve plunger.

7. The combination of claim 1 wherein said armature core has a transducer arm extending axially therefrom into said sleeve means, said transducer arm being threaded for threaded engagement by one of said thread means of said sleeve means, and said valve plunger has a threaded end for threaded engagement with another of said thread means of said sleeve means.

8. The combination of claim 7 wherein said lost-motion connection comprises a slot in the end of one of said transducer arm and threaded extension, and a projection on the end of the other of said transducer arm and threaded connection which is received in said slot.

9. The combination of claim 2, further comprising spring means for biasing said locking collar into engagement with said multi-sided exterior surface on said valve plunger.

10. The combination of claim 1 wherein said different thread means on said sleeve means are of opposite hand and of the same pitch to provide a relatively coarse adjustment for said armature core relative to said valve plunger.

11. The combination of claim 1 wherein said different thread means on said sleeve means are of opposite hand and of different pitch to provide a relatively coarse adjustment for said armature core relative to said valve plunger.

12. The combination of claim 1 wherein said different thread means on said sleeve means are of the same hand and of different pitch to provide a relatively fine adjustment for said armature core relative to said valve plunger.

13. The combination of claim 2 wherein there are at least six sides on the engageable surfaces of said locking collar and valve plunger to provide incremental adjustments corresponding to one-sixth of a revolution of said locking collar.

14. In combination, a fluid valve and transducer mechanism for monitoring valve position, said valve including an axially movable valve plunger with a threaded extension on one end, and said transducer mechanism including an armature core having a threaded transducer arm extending therefrom, a slot in the end of one of said transducer arm and threaded extension, a projection on the end of the other of said transducer arm and threaded extension received in said slot, an adjuster sleeve surrounding the ends of said transducer arm and threaded extension, said adjuster sleeve having different internal thread means at opposite ends thereof in threaded engagement with the threads on said transducer arm and threaded extension, whereby rotation of said adjuster sleeve in opposite directions will cause axial movement of said armature core toward and away from said valve plunger, and a locking collar surrounding said adjuster sleeve, said locking collar having a multi-sided internal surface engaging a correspondingly shaped multi-sided exterior surface on said adjuster sleeve and being movable into and out of engagement with another correspondingly shaped multi-sided exterior surface on said valve plunger to respectively prevent and permit rotation of said locking collar and associated adjuster sleeve.

15. The combination of claim 14 further comprising a nut threaded onto said threaded extension, the exterior surface of said nut constituting said another multi-sided exterior surface on said valve plunger.

16. The combination of claim 15 wherein said valve plunger is hollow, and a drive shaft extends through the center of said valve plunger and therebeyond, the end of said drive shaft extending beyond said valve plunger being threaded to define said threaded extension on said valve plunger.

17. The combination of claim 14 further comprising spring means for biasing said locking collar into engagement with said another multi-sided exterior surface on said valve plunger.

18. The combination of claim 14 wherein said different thread means of said sleeve means are of opposite hand to provide a relatively coarse adjustment of said armature core relative to said valve plunger during each revolution of said adjuster sleeve.

19. The combination of claim 14 wherein said different thread means of said adjuster sleeve are of the same hand and of different pitch to provide a relatively fine adjustment of said armature core relative to said valve plunger for each revolution of said adjuster sleeve.

* * * * *